United States Patent [19]

Sues et al.

[11] Patent Number: 4,493,948
[45] Date of Patent: Jan. 15, 1985

[54] TRANSPARENT SECONDARY INFORMATION TRANSMISSION SYSTEM FOR AN INFORMATION TRANSMISSION SYSTEM

[75] Inventors: John M. Sues, Absecon, N.J.; Carmine Cupani, Bronx, N.Y.

[73] Assignee: The Inteleplex Corporation, Atlantic City, N.J.

[21] Appl. No.: 508,126

[22] Filed: Jun. 27, 1983

[51] Int. Cl.³ .......................................... H04M 11/06
[52] U.S. Cl. .................. 179/2 A; 179/2 DP; 179/5 R
[58] Field of Search ............... 179/2 A, 2 AM, 2 DP, 179/5 R, 5 P, 84 VF, 2.51; 370/5

[56] References Cited

U.S. PATENT DOCUMENTS

| | | | |
|---|---|---|---|
| 2,568,342 | 9/1951 | Koehler et al. | 179/2 A |
| 3,872,253 | 3/1975 | Jurschak | 179/5 R |
| 3,922,490 | 11/1975 | Pettis | 179/2 A |
| 3,937,889 | 2/1976 | Bell et al. | 179/2 A |
| 4,332,980 | 6/1982 | Reynolds et al. | 179/2 AM X |

FOREIGN PATENT DOCUMENTS

| | | | |
|---|---|---|---|
| 207834 | 4/1924 | United Kingdom | 370/5 |
| 368656 | 3/1932 | United Kingdom | 370/5 |

*Primary Examiner*—Gene Z. Rubinson
*Assistant Examiner*—W. J. Brady
*Attorney, Agent, or Firm*—Kenyon & Kenyon

[57] ABSTRACT

A transparent secondary information transmission system for a primary information transmission system is disclosed. The system includes at least one local condition monitor for monitoring at least one of a plurality of input conditions such as temperature, light, smoke or the presence of an intruder. The information representing the condition is digitized and processed by the local condition monitor. The digitized signals are then transmitted over the transmission system in such a way that no interference with normal transmission occurs. At the receiving end, the signals are processed to determine from which of the local condition monitors the signals are being received and what the status of the monitored condition is. A determination is then made whether an alarm should be generated. In the preferred embodiment, the primary information transmission system to which the secondary information transmission system is adapted to be coupled is a telephone network.

30 Claims, 6 Drawing Figures

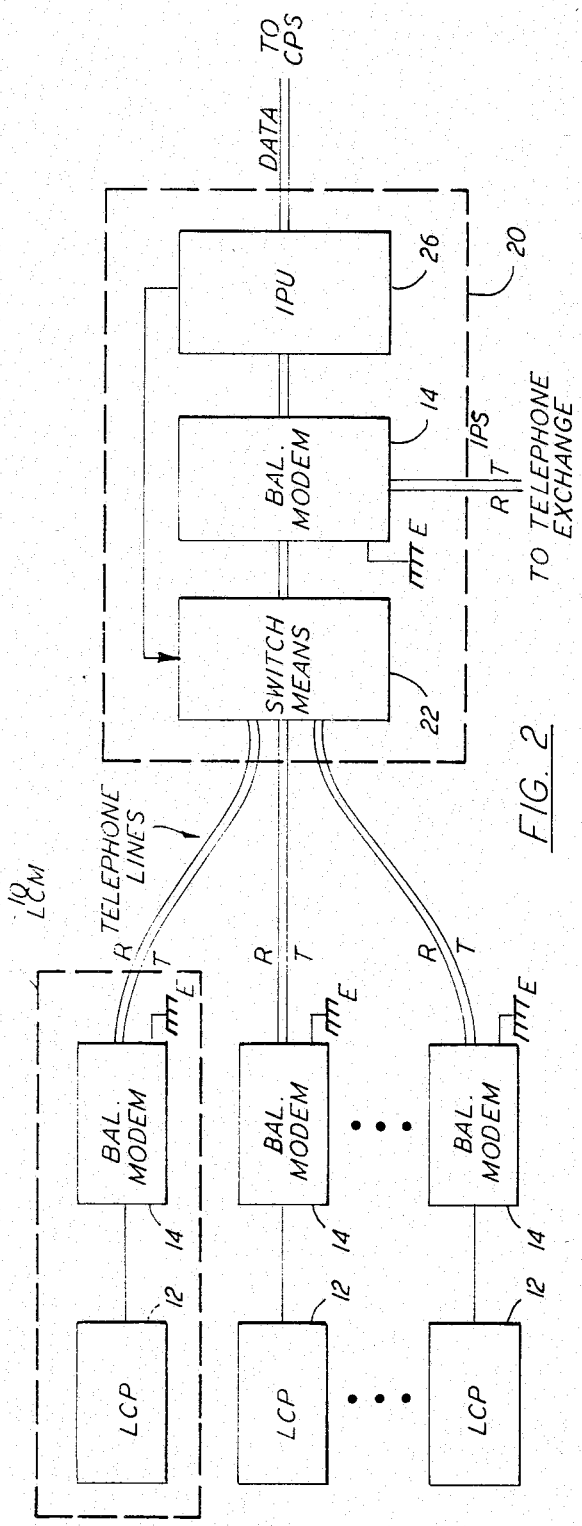
FIG. 2
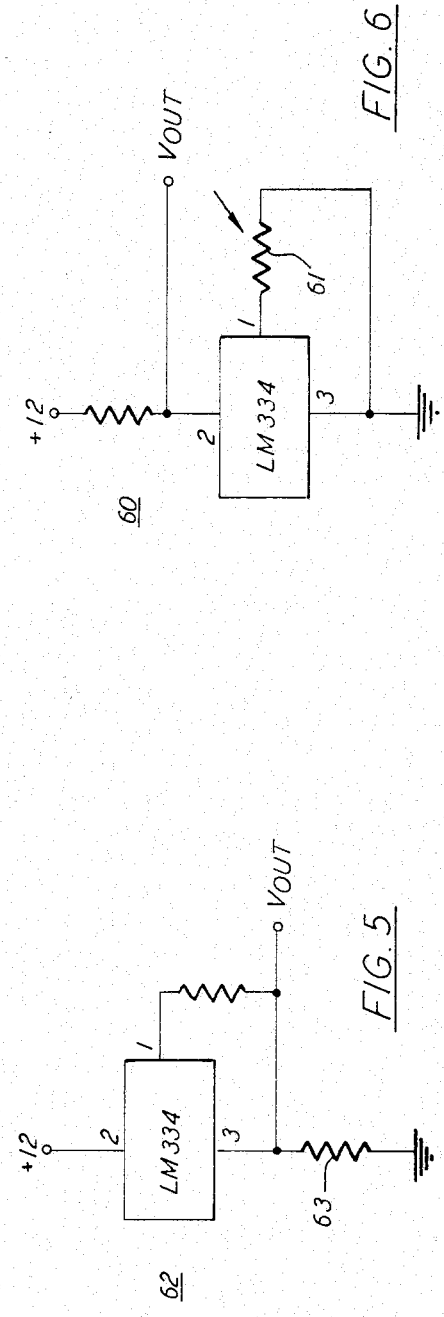
FIG. 6
FIG. 5

TRANSPARENT SECONDARY INFORMATION TRANSMISSION SYSTEM FOR AN INFORMATION TRANSMISSION SYSTEM

BACKGROUND OF THE INVENTION

The present invention relates to the field of information transmission and more particularly to a secondary information transmission system such as a monitoring and/or regulating or control system adapted to be coupled in an information transmission system transparent to the information transformation system. In particular, the R present invention has application to telephone systems whereby telephone lines are used by the secondary system to continuously transmit information without disturbing normal communications on the telephone lines.

It would be highly desireable to utilize an information transmission system (sometimes hereinafter referred to as a primary system), particularly an existing system such as a telephone system or an intercom system, to name two, for transmitting additional information without disturbing normal information transmission of the system. The information transmission system could then be used to monitor one or more conditions at one or more locations in the information transmission system, and transmit condition information to a remote location which could be an intermediate or central location in the information transmission system, while the system carries out its primary information transmission function. Conditions which can be monitored might include, for example, temperature, light, smoke and the presence of an intruder at the monitored location. It would be further desireable if the primary information transmission system could be used for two-way secondary information transfer. In such a case, not only could a condition be monitored at a location in the primary information transfer systems, but also apparatus could be controlled in response to the monitored condition from the remote location. For example, temperature could be monitored and heating or cooling apparatus could be controlled, or light could be regulated and lighting apparatus controlled.

SUMMARY OF THE INVENTION

It is an object of the present invention to provide a secondary information transmission system for an information transmission system which is transparent to the information transmission system.

It is another object of the present invention to provide a secondary, two-way information transmission system for an information transmission system which is transparent to the information transmission system.

It is another object of the present invention to provide a condition monitoring and/or control system for connection to an information transmission system, for example, a telephone system, which is transparent to the information transmission system.

It is a further object of the present invention to provide a monitoring system transparent to an information transmission system which monitors at least one condition to determine the occurrence of, for example, fire or intrusion. Conditions such as temperature, the presence of smoke, light and motion may thus be monitored.

It is a still further object of the present invention to provide a means for transmitting information regarding at least one condition over an information transmission system totally transparent to the normal operation of the information transmission system.

It is a yet further object of the present invention to provide a means for transmitting information regarding at least one condition over a telephone system and/or information for controlling apparatus, without interfering with normal use of the telephone system.

It is another object of the present invention to provide a secondary information transmission system for connection to an information transmission system transparent thereto for controlling apparatus at one location from a remote location, particularly in response to one or more conditions monitored by the secondary information transmission system at the one location.

The present invention provides an information transmission system which in its different aspects achieves the foregoing and other objects.

In one of its aspects, the invention provides a method for transmitting a signal from a first location in an information transmission system to a second location in the information transmission system, the information transmission system including two conductive links linking the first and second locations over which normal information transfer in the system is carried out, the method comprising coupling the signal between one of the links and earth ground and between the other of the links and earth ground at the first location and receiving the signal at the second location between at least one of the links and earth ground.

In a preferred embodiment, the signal is coupled to each of two conductors linking the first and second locations between a respective conductor and earth ground, and wherein the signal is received at the second location between at least one of the two conductors and earth ground. The method is particularly applicable to a telephone system wherein the signal is coupled to a ring/tip conductor pair at the first location between the respective conductor and earth ground, and wherein the signal is received at the second location between at least one of the ring and tip conductors and ground.

In another of its aspects, the invention provides apparatus for carrying out the method.

The apparatus is transparent to the information transmission system, which in a preferred embodiment is a telephone system. The apparatus in a preferred embodiment is coupled to a ring/tip conductor pair at a first location in the telephone system. A telephone can be connected to the same ring/tip conductor pair, the apparatus being unaffected by the operating state of the telephone.

The apparatus can comprise a modem coupled to the ring/tip conductor pair at one location and another modem coupled to the ring/tip pair at a second location. The modems can be connected for transmitting a signal over a single pair of ring and tip conductors from the first location to the second location in the telephone system so that the same signal is transmitted on the ring and tip conductors between a respective conductor and earth ground, balanced so as to substantially not disturb voice communication over the ring and tip conductors in the telephone system. The modems can be connected for one or two way transmission. The receiving modem outputs its signal between either or both the ring and tip conductors and earth ground.

In another of its aspects, the invention provides a condition monitoring system connected in an information transmission system comprising means for monitoring at least one condition at a first location and providing a signal representative of the condition, means coupled to the information transmission system for transmitting the signal on a link of the communication system to a second location in a form substantially not disturbing information transmission in the information transmission system in an operating mode thereof, and means coupled to the information transmission system for receiving the signal transmitted by the transmitting means. The means for transmitting and/or the means for receiving when coupled to the information transmission system is substantially transparent to the information transmission system.

Means are coupled to the receiving means for at least one of indicating the status of the condition, storing the status of the condition and activating at least one of alarm apparatus and transmission apparatus. A plurality of monitoring means can be disposed at a corresponding plurality of locations for monitoring at least one common condition at the respective locations, each of the monitoring means providing a signal representative of the common condition. Means can be coupled to the receiving means for processing the signals representing the common condition and determining a relationship of the common condition at the respective locations.

The present invention in one of its aspects provides means for determining if a fire has occurred at the remote location, or intruders have entered the remote location, or if the regulation of temperature or light is required.

Thus, the monitoring means can include means for monitoring for the presence of fire and can monitor for the presence of smoke, temperature and light. The monitoring means can include means for simply monitoring temperature, or light, or for determining the presence of an intruder at the remote location. When smoke and/or temperature are being monitored as a common condition at several locations, the direction in which a fire is spreading can be determined. With such information, fire officials can predict locations to which the fire may immediately spread or to which the fire may possibly spread.

In a preferred embodiment, as mentioned, the condition monitoring system can be coupled to a telephone system. Thus, in another of its aspects, the invention provides a condition monitoring system connected in a telephone system comprising means for monitoring at least one condition at a first location in the telephone system and providing a signal representative of the condition, means coupled to a pair of ring and tip lines of the telephone system at the first location and to earth ground for transmitting the signal simultaneously on both said ring and tip lines such that substantially no signal is produced across the ring and tip lines from transmission of the signal on both the ring and tip lines, and means adapted to be coupled to at least one of the ring and tip lines and to earth ground for receiving the signal at a second location in the telephone system. The means for transmitting and the means for receiving are substantially unaffected by the operating state of a telephone connected to the same ring/tip pair as the means for transmitting.

The condition information transmitted over a telephone system line substantially does not disturb voice communications occurring simultaneously over the line. The condition information can be transmitted regardless of whether a telephone is in use.

By using telephone lines to monitor the conditions, the precise location where the condition has occurred can be determined. A system according to the invention is therefore much more flexible than other condition monitoring systems in that the exact location where the condition has occurred may be determined. For example, the precise location of a fire or intruder could be determined within a large apartment building using the internal telephone system of the building. The information can be made available in a control location in the building or sent to another location using external telephone lines. Furthermore, the condition monitoring system is transparent to the telephone system, so that normal telephone voice communications may be achieved while the conditions are being monitored, and the conditions may be monitored even when the particular telephone lines being monitored are not being used for voice communications.

The inventive system can be incorporated in a device which functions as a normal telephone at all times, but which at the same time provides the inventive features summarized above.

Other objects, features and advantages of the present invention will appear from the detailed description which follows.

BRIEF DESCRIPTION OF THE DRAWINGS

The invention will be described in greater detail in the detailed description below with reference to the attached drawings, in which:

FIG. 2 is a more detailed block diagram of the local condition monitor and intermediate processing station of FIG. 1;

FIG. 5 is a schematic diagram of a sensor unit forming part of a local condition monitor; and FIG. 6 is a schematic diagram of another of the sensor units.

DETAILED DESCRIPTION

Figure 1:
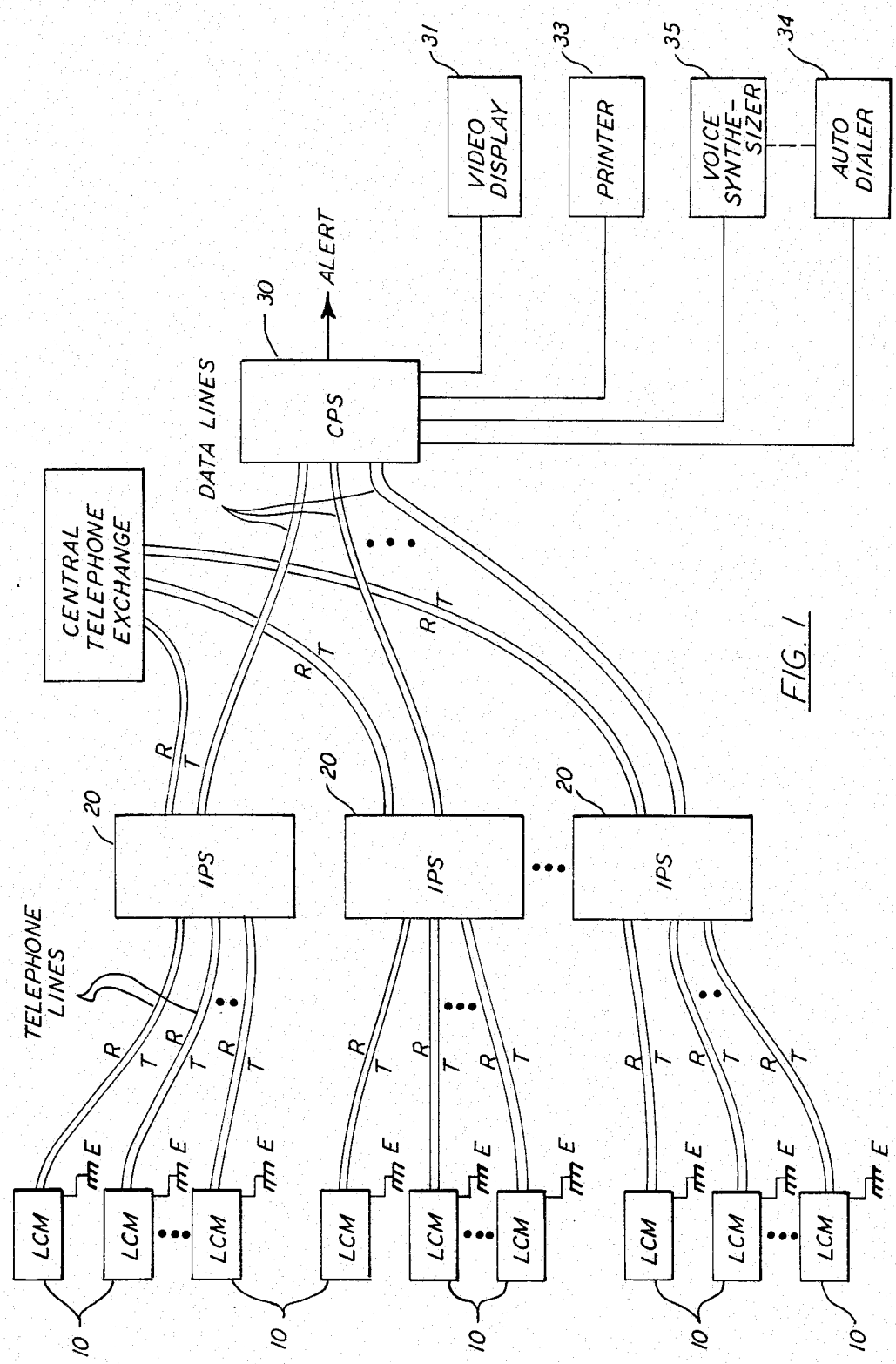
FIG. 1 is an overall block diagram of a transparent condition monitoring system according to the present invention.

With reference now to the drawings, FIG. 1 is an overall block diagram of a system according to the present invention. The system comprises a number of local condition monitors 10 (LCM) which are located at each remote location, preferably in close proximity to a telephone. The LCM may also be installed integrally in a custom built telephone which can also include all the condition sensing devices (e.g. heat, light, motion, smoke, etc.). The LCM's are each connected by the ring and tip lines (R and T) of a normal telephone link to an intermediate processing station 20 (IPS), which may be located at a central telephone exchange, on a telephone pole where it could serve for example, an entire neighborhood, or in an apartment building, where it could service the entire building or parts thereof. Additional IPS's are added to serve additional LCM's. Each IPS is then coupled via telephone lines or by some other information transmission means to a central processing station 30 (CPS) which monitors all the IPS's and forwards information to a higher order station or reacts, for example, issuing an alert, if any of the LCM outputs provides a signal which indicates that one of the monitored conditions has occurred. Due to the hardwired nature (via the telephone line) of each of the LCM's to the IPS, each IPS is able to determine precisely which LCM is sending a signal when the IPS scans the LCM's in a sequence. When the IPS determines that a condition has occurred at a particular LCM, it transmits information to the CPS indicating at which LCM a condition has occurred and the nature of the condition. Alternatively, the IPS can simply transmit information received from the LCM's to the CPS. The CPS can issue an alert when it or the IPS has determined that an alert condition exists. The CPS can also include a video display 31, printer 33, automatic dialer 34 and voice synthesizer 35, among other options so that an operator can determine where a condition has occurred and the nature of the condition and alert the proper authorities or person through the automatic dialer. Additionally, in the case of a condition common to several LCM's, such as a fire, the CPS can keep track of the common condition so that, for example, the spread of the fire can be tracked. The IPS and CPS can each incorporate any of several known microcomputers such as the Apple 2E, IBM PC or the Rainbow 100 manufactured by Digital Equipment Corporation. The CPS may require additional memory capacity for table look-up functions so that the CPS can compare the data received from the IPS with the data stored in memory to determine which LCM generated the condition. Additionally, the CPS may also require to have stored therein the telephone numbers of the proper authorities or persons to which alerts are to be transmitted FIG. 2 illustrates part of the system shown in FIG. 1 in more detail for one IPS 20. Each LCM comprises a local condition processor 12 (LCP) and balanced modem 14. As shown in FIGS. 1 and 2, each LCM is connected to the ring (R) and tip (T) lines of the telephone line and to earth ground (E). The LCP includes means for sensing the occurrence of any one of a number of conditions to be monitored and means for processing the signal into digital form for coupling to the balanced modem 14. The balanced modem couples the LCP to the telephone R and T lines so that the data transmitted longitudinally over the telephone lines is essentially transparent to the telephone communications network. Thus, the digital data representing the monitored conditions may be sent over the telephone lines without interfering with normal telephone usage and voice communications. The manner in which this is accomplished will be described in more detail later with reference to FIG. 4.

The IPS 20 includes multiport controller switch means 22, another balanced modem 14 and an intermediate processing unit 26 (IPU). The IPU can be any general or special purpose microcomputer or computer system, as discussed above. The function of the switch means 22 is to switch the IPS located balanced modem 14 across each of the incoming telephone lines under the control of the IPU. In this way, the IPU can scan each of the incoming telephone lines one at a time to monitor for the occurence of a sensed condition. The balanced modem 14 in the IPS is the same as the balanced modems in the LCM's, although it may have several additional features, to be described later, for two-way information transfer, used, for example, for system control or control of apparatus at the LCM locations. Each IPU is coupled to the CPS as described earlier.

Figure 3:
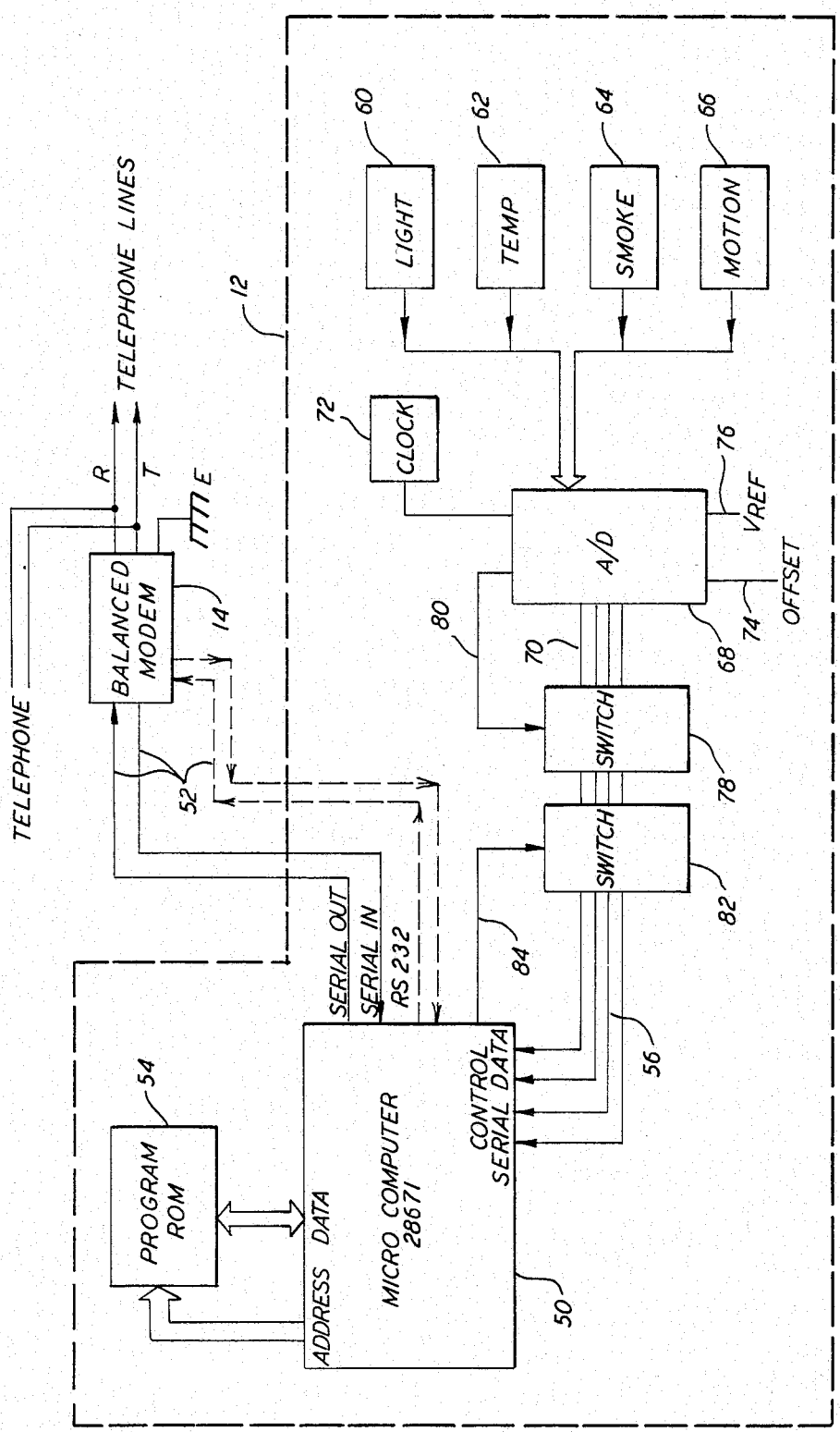
FIG. 3 is a more detailed block diagram of the local condition monitor of FIG. 1 for determining the occurrence of any of a number of specified conditions.

FIG. 3 is a more detailed block diagram of the LCM. The LCM comprises the LCP 12 which is based around a small microcomputer such as the Zilog Z8671 BASIC interpreter and the balanced modem 14. The microcomputer is shown by reference numeral 50. The microcomputer's serial output and input port, which may be a type RS-232 serial port, is coupled to the balanced modem 14 via lines 52. An initializing and operating program ROM 54 is coupled to the address and data busses of the microcomputer. Preferably, 4K bytes of ROM are provided. The microcomputer may have separate data and address busses or may have a common address/data bus. Serial digitized data is also fed to the data bus of the microcomputer on lines 56. This data originates as analog signals from the various sensors 60, 62, 64 and 66, which respectively sense light, temperature, smoke and motion. The light and temperature sensors will be described in more detail later. The smoke and motion sensing devices may be appropriately modified commercially available smoke and ultrasonic intrusion detection units. For example, the smoke detector may be an Archer model 49-455 smoke detector available from Radio Shack with the piezoelectric output alarm removed and the output hardwired to the LCM. Similarly, the ultrasonic intrusion detector may be a Safehouse model 49-306 intrusion detector available from Radio Shack with its output alarm device removed and the output hardwired to the LCM. The outputs from all of the sensing devices are coupled to the channel inputs of an analog to digital converter 68 (A/D) such as an AD7581, available commercially from Analog Devices. The A/D and associated hardware is also conveniently available from MicroMint, Inc. already packaged on a preassembled circuit board. The AD7581 A/D has a maximum of eight input channels and thus up to eight conditions could be sensed. Only four are shown in FIG. 3. The analog signals available at the output of these sensing devices are sampled by the A/D converter 68 simultaneously and outputted at the same time serially on output lines 70. A clock 72 controls the sampling rate, which may, in the illustrated embodiment, provide a time period of 640 uses between samples. Offset 74 and reference 76 voltages are applied to the A/D 68 in a known manner to calibrate the A/D for the range of input voltages, (which in the illustrated embodiment, range between 0 and 10 volts) and to calibrate the A/D for a zero voltage level input, respectively. The serial data outputs 70 of the A/D are fed to an electronic switch or tri-state buffer 78 which is enabled by the A/D on line 80 once the A/D has completed a scan of the sensor analog input voltages. The serial outputs from buffer 78 are coupled to a further electronic switch or tri-state buffer 82, the output of which is coupled to the data bus of the microcomputer 50.

In this way, once A/D converter 68 has completed a scan of the analog input voltages from the sensing devices, switch 78 will be enabled via line 80, thus transmitting data to switch 82. The microcomputer will at some point in its program enable switch 82, thus allowing the data to reach its data bus. Because the data is serial in nature, the microcomputer 50 waits until it has received a start bit before processing the input data. Each serial scan of the A/D comprises a number of data bits, (up to a maximum of eight bits, the resolution of the A/D), is preceded by a start bit and followed by a stop bit, in conventional fashion The microcomputer 50 then processes the data between the start and stop bits into the two byte form show in the Table below, for serial output to the balanced modem 14.

TABLE

| Byte 1: | |
|---|---|
| bit 0: | burglar alarm armed (1) or unarmed (0) |
| bit 1: | burglar alarm on (1) or off (0) |
| bit 2: | smoke alarm (1) |
| bits 3-6: | light intensity level |
| bit 7: | 0 |
| Byte 2: | |
| bits 0-6: | temperature (degrees Celcius) |
| bit 7: | 1 |

As can be seen, bit 7 is used to synchronize the two byte communications between the LCM and the IPS. The IPS can determine which byte is which by the condition of bit 7 in each byte.

Figure 4:
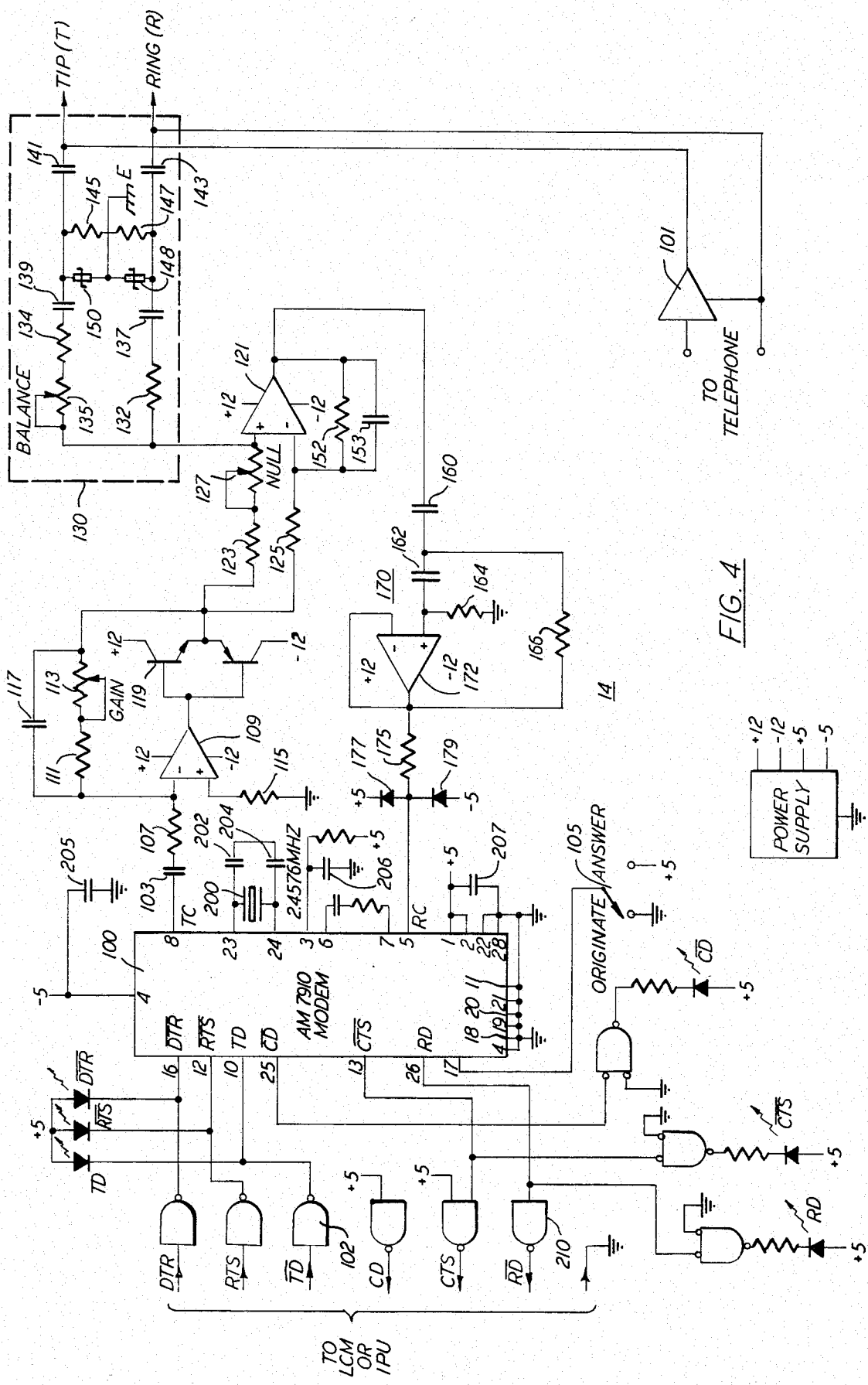
FIG. 4 is a schematic diagram of a portion of the system shown in FIGS. 2 and 3.

The output of the balanced modem is applied across the R and T lines of the telephone transmission link. The telephone, which may be incorporated in the LCM itself, is connected across the R and T lines in conventional fashion. The balanced modem 14 is also connected to an earth ground E. Power for both the LCP and the balanced modem is provided from an on-board or external power supply which is plugged into an AC wall outlet (FIG. 4). Logic voltage power levels such as ±5 and ±12 volts are supplied to the LCP and balanced modem circuits. The function, description and operation of the balanced modem 14 will now be explained.

Balanced modem 14 provides a frequency shift keyed (FSK) balanced digital signal representative of the digitized monitored signals longitudinally on both the R and T lines of the telephone transmission line. Normal voice communications are determined by the varying potentials existing between the R and T lines. The digital data transmission, however, representative of the monitored signals, is modulated on a frequency shift keyed basis onto both R and T lines with balanced phase and amplitude as determined by the conditions present on the telephone lines. Because the same signal is longitudinally present on both R and T lines, regular voice communication is left unaffected because the equal amplitude and phase signals on R and T cancel at the receiving telephone. The balanced modem is essentially the same at both ends of the telephone link. The digital data representative of the monitored conditions, however, is determined between either R and earth ground (E) or T and earth ground (E). For this reason, the balanced modems at both transmitting and receiving ends are connected to earth ground. Thus, the present invention provides a way to transmit digital data over a two line telephone transmission link at the same time that normal voice communications are occurring with essentially no disruption in voice communications. The balanced modem may, however, load the telephone lines, for example, creating a 3 dB drop in voice signal level. Such loading can be compensated very simply, for example, by placing a small amplifier as shown by reference numeral 101 (FIG. 4) in the telephone circuit to amplify the voice transmissions.

Referring now to FIG. 4, balanced modem 14 includes a commercially available modem chip 100 such as the AM7910 available from Advanced Micro Devices. At the LCM end of the transmission system, digital data from the microcomputer 50 is transmitted via line TD to a line receiver 102 such as a type MC1489, which inverts and converts the RS232 levels to TTL compatible levels. The data to be transmitted is thus placed at the TD (transmitted data) input of modem chip 100. Modem chip 100 functions in normal fashion to generate an FSK signal. Depending on whether a particular modem is placed in originate or answer mode (as determined by switch 105 as shown), the output frequencies from the modem chip (line TC) will be 1070 HZ (logic 0) and 1270 HZ (logic 1) for originate mode (carrier at 1170 HZ) or 2025 HZ (logic 0) and 2225 Hz (logic 1) for answer mode (carrier at 2125 HZ), as determined by the Bell 103 standard. The FSK signals are fed on line TC through coupling capacitor 103 and resistor 107 to operational amplifier 109, which may be a type LF347 operated in the inverting mode. Gain is determined by resistors 107, 111, 113 and 115. Resistor 113 is utilized to vary the gain and thus the amplitude of the output signal. Capacitor 117 is provided for frequency response. The output of amplifier 109 is provided to complementary transistor pair 119 which functions as a dual emitter follower for providing current gain for both positive and negative signal inputs. The NPN transistor may be a type MPSU01 and the PNP transistor may be a type MPSU51. The output from complementary transistor pair 119 is coupled back via the feedback loop to the inverting input of the op-amp 109. The output from pair 119 is further coupled to the inverting and non-inverting inputs of op-amp 121 via resistors 123 and 125 and variable resistor 127. Variable resistor 127 is provided so that minimal transmitted carrier level appears at the receiving input (RC) of the modem chip 100. Op-amp 121, which may also be a type LF347, functions as a duplexer, to be explained later. The signal at the non-inverting input is further coupled to a line coupler circuit 130 which couples the modulated signal to both the R and T telephone lines. Thus, the modulated signal is placed on both the R and T lines so that it is transparent to the telephone network as described. Line coupler 130 includes resistors 132, 134, 135, 145 and 147, capacitors 137, 139, 141 and 143 and high current clamping devices 148 and 150, such as zener diodes, varistors or transorbs (the latter manufactured by General Semiconductor). Variable resistor 135 is provided for varying the amplitude of the signal to the T conductor to compensate for unbalanced lines. In this way, equal signal amplitudes will be developed at both T and R conductors and thus will be cancelled across the T and R pair for minimum inteference with the voice signal. Ringing generator and other low frequency signals are attenuated by the two pole passive networks comprising capacitors 139, 141, 137 and 143 and resistors 145 and 147. Ringing generator signals and transients are further clamped to acceptable levels so as not to harm the circuit by clamping devices 148 and 150. An acceptable level might be 12 volts between T or R and earth ground E, which is connected to the line coupler as shown.

Although in its simplest form, the LCM located balanced modem need only transmit data and the IPS located balanced modem need only receive data, the duplexer circuit centered around op-amp 121 is provided so that the modems can be used at either end of the line and also so that the system can be expanded to provide two way transmission for other functions such as energy management, for example, whereby a condition such as light and heat could be monitored remotely and a signal sent back to the monitored location from the CPS to turn on or off energy generating or consuming devices.

To this end, the output of duplexer op-amp 121 is coupled through a coupling capacitor 160 to an active high pass filter 170. Resistor 152 is provided to set the gain of duplexer op-amp 121 and capacitor 153 is provided for frequency response.

Active high pass filter 170 includes op-amp 172, which may also be a type LF347. Frequency response is determined by components 160, 162, 164 and 166. High pass filter 170 is of 2 pole design and serves to attenuate low frequency signals originating on the telephone transmission line Duplexer 121 functions to attenuate transmitted signals and to allow received signals to be passed on to active high-pass filter 170. The output of high pass filter 170 is then coupled via resistor 175 to the RC input of modem chip 100. Diodes 177 and 179 serve to clamp the received signal at approximately five volt levels.

The component values of active filter 170 may be changed to provide different frequency responses depending on whether the modem is being used in originate or answer modes (thus allowing the modem to be used at both ends of the system).

Returning to modem chip 100, an oscillator frequency source is provided by crystal 200 and capacitors 202 and 204. Plus and minus 5 volt supplies are connected as indicated with capacitors 205, 206 and 207 being provided for transient suppression. The other connections not already described or to be described later are made as well known to those skilled in the art.

Demodulated data is provided at output RD and converted to RS232 standard levels by line driver 210 which may be a type MC1488.

At the LCM end of the link, only lines $\overline{RD}$ and $\overline{TD}$ need be provided. The remaining lines DTR (Data Terminal Ready), RTS (Request to Send), CD (Carrier Detect) and CTS (clear to send) will typically be tied high at the LCM end of the link because at this end, the modem need only transmit information. No "handshaking is required" in the embodiment described. If two way transmission is required, then those lines will be used.

In the system described, the LCM continually outputs data concerning the monitored conditions. The IPS scans the various LCM's in a sequence to retrieve the condition sensitive data. The system could, however, be modified so as to provide a "polling" system, wherein two way transmission is effected between IPS and LCM and the IPS "polls" each of the LCM's before receiving a return signal from the LCM.

For example, RTS may be used to turn the modem carrier on at the IPS end should two way transmission be required, as discussed above. DTR is also placed at a logic 1 level when the modem is required to transmit. CD is used to indicate that a received carrier is present and CTS indicates that the carrier generated by the modem is ready to be modulated for transmission.

Various LED's, gates and resistors are provided to indicate the status of the various lines.

FIGS. 5 and 6 illustrate two of the sensors provided for temperature and light monitoring. Temperature may be monitored by using, for example an LM334 variable current source as shown in FIG. 5. As the temperature increases, current through load resistor 63 increases, thus driving up the output voltage. The light sensor is shown in FIG. 6. The resistance of a cadmium sulfide photocell 61 changes in response to light, thus changing the output voltage An IPU is coupled to the modem in the IPS. The IPU can process information transmitted from the LCM's either for status or other determination or for forwarding to the CPS. The IPU could also forward status determinations to the CPS. Thus, the IPU can include an input/output device (not shown) and may include another modem for transmitting information to the CPS. Either the IPS or CPS can process data, for example, to determine the presence of a fire or intrusion at any monitored location in the system, and the direction in which a fire may be spreading.

As mentioned, the modems could be connected for two-way transmission In such a case, the LCM's could include means for processing information from the IPS, or the microcomputer described with reference to FIG. 3 can accomplish this. The means for processing could be used, for example, to effect switching of electrical apparatus such as lights and heating or cooling apparatus.

While the system has been described as a constant transmit/scanning/receive system in which LCM's are asynchronously transmitting, and the IPS is sequentially scanning the LCM's, the system can be operated on a polled basis utilizing the two-way transmission mentioned above.

In the foregoing specification, the invention has been described with reference to a specific examplary embodiment thereof. It will, however, be evident that various modifications and changes may be made thereunto without departing from the broader spirit and scope of the specification and drawings are, accordingly, to be regarded in an illustrative rather than in a restrictive sense.

What is claimed is:

1. A condition monitoring system adapted to be connected in a telephone system comprising circuit means for monitoring at least one condition at a first location in the telephone system and providing a first signal representative of the condition, first means adapted to be coupled to a pair of ring and tip lines of the telephone system at the first location and to earth ground for transmitting substantially said first signal simultaneously on both said ring and tip lines such that substantially no signal is produced across said ring and tip lines from transmission of said first signal on both said ring and tip lines, second means adapted to be coupled to the ring and tip lines at the second location and earth ground for transmitting substantially a second signal simultaneously on both said ring and tip lines such that substantially no signal is produced across said ring and tip lines from transmission of said second signal on both said ring and tip lines and for receiving said first signal at said second location in the telephone system and generating a signal responsive to a predetermined condition of said first signal, said first means further comprising balanced modulator/demodulator means for receiving said second signal from said second location transmitted on said ring and tip lines, said first balanced modulator/demodulator means further comprising modulator means for converting said first signal into a modulated signal, amplifier means for increasing the amplitude of said modulated signal so as to produce an amplified modulated signal, said amplified modulated signal present on an output of said amplifier means, said output coupled to telephone line coupling means, said telephone line coupling means comprising resistor/capacitor circuit means coupled to both said ring and tip lines of said telephone system for coupling said amplified modulated signal to both said ring and tip lines and further comprising means for adjusting said amplified modulated signal so that said amplified modulated signal is substantially undetected across said ring and tip lines but may be detected across either of said ring and tip lines and earth ground, whereby said first means for transmitting is substantially transparent to said telephone system, and further comprising duplexer means coupled to the output of said amplifier means and to said telephone line coupling means, said duplexer means having an output coupled to filter means, said duplexer means allowing said second signal received by said telephone line coupling means to be coupled to said filter means, and further comprising demodulator means for converting said received signals into a demodulated signal, said filter means coupled to said demodulator means, said demodulated signal coupled to said circuit means for controlling said circuit means.

2. The condition monitoring system according to claim 1 wherein said second means comprises second balanced modulator/demodulator means comprising modulator means for converting said second signal into a second modulated signal, second amplifier means for increasing the amplitude of said second modulated signal so as to produce a second amplified modulated signal, said second amplified modulated signal present on an output of said second amplifier means, said output coupled to second telephone line coupling means, said second telephone line coupling means comprising resistor/capacitor circuit means coupled to both said ring and tip lines of said telephone system for coupling said second amplified modulated signal to both said ring and tip lines and further comprising means for adjusting said second amplified modulated signal so that said second amplified modulated signal is substantially undetected across said ring and tip lines but may be detected across either of said ring and tip lines and earth ground, whereby said second means for transmitting is substantially transparent to said telephone system, and further comprising second duplexer means coupled to the output of said second amplifier means and to said second telephone line coupling means, said second duplexer means having an output coupled to second filter means, said second duplexer means allowing said first signal received by said second telephone line coupling means to be coupled to said second filter means, and further comprising second demodulator means for converting said received signal into a demodulated signal, said filter means coupled to said demodulator means, said demodulated signal coupled to means for generating said signal responsive to a predetermined condition of said first signal.

3. The condition monitoring system according to claim 1 including means coupled to the second means for at least one of indicating the status of the condition, storing the status of the condition and activating at least one of alarm apparatus and transmission apparatus.

4. The condition monitoring system according to claim 1 including a plurality of monitoring means disposed at a corresponding plurality of locations for monitoring at least one common condition at the respective locations, each of the monitoring means providing a signal representative of the common condition, and means coupled to the second means for at least one of indicating the status of the common condition at one or more of the locations, storing the status of the common condition at the plurality of locations and activating at least one of alarm apparatus and transmission apparatus in response to one or more of the signals.

5. The condition monitoring system according to claim 1 including a plurality of monitoring means disposed at a corresponding plurality of locations for monitoring at least one common condition at the respective locations, each of the monitoring means providing a signal representative of the common condition, and means coupled to the second means for processing the signals representing the common condition and determining a relationship of the common condition at the respective locations.

6. The condition monitoring system according to claim 5 wherein the monitoring means includes means for monitoring for the presence of a fire.

7. The condition monitoring system according to claim 6 wherein the means for monitoring a fire includes at least one of means for monitoring for the presence of smoke, means for monitoring temperature and means for monitoring light.

8. The condition monitoring system according to claim 5 wherein the monitoring means includes means for monitoring temperature.

9. The condition monitoring system according to claim 5 wherein the monitoring means includes means for monitoring light.

10. The condition monitoring system according to claim 5 wherein the monitoring means includes intrusion detection means.

11. The condition monitoring system according to claim 1 wherein the first means is adapted to be coupled to a pair of ring and tip lines to which a telephone is coupled.

12. The condition monitoring system according to claim 11 wherein the first means is substantially unaffected by the operating state of the telephone.

13. The condition monitoring system according to claim 11 wherein the first and second means are substantially unaffected by the operating state of the telephone.

14. The condition monitoring system according to claim 1 and including means for processing data coupled to the second modulator/demodulator means at said second location for at least one of controlling transmission of said first signal from the first location and processing said signal at the second location.

15. A condition monitoring system adapted to be connected in a telephone transmission system comprising means for monitoring at least one condition at each of a plurality of first locations and providing a plurality of first signals representative of the respective conditions, means at each of said first locations adapted to be coupled to the telephone transmission system for transmitting the first signal on respective ones of a plurality of links of the telephone transmission system to a second location in a form substantially not disturbing telephone voice transmission in the telephone transmission system in an operating mode thereof whereby said means for transmitting when coupled to the telephone transmission system is substantially transparent to the telephone transmission system, each of said links comprising a pair of ring and tip lines, each of said transmitting means coupled to respective pairs of said ring and tip lines and to earth ground whereby respective ones of said first signals substantially are transmitted simultaneously on said respective pairs of said ring and tip lines such that substantially no signal is produced across said ring and tip lines from transmission of said first signal on both said ring and tip lines, and means adapted to be coupled to each of the telephone transmission system ring and tip lines and to earth ground at a second location for receiving the first signals transmitted by each of the transmitting means, each of said means for monitoring further comprising sensing means for sensing said at least one condition, analog to digital converter means for converting an analog output of said sensing means to a digital signal, first computer means coupled to said analog to digital converter means for processing said digital signal into a serial format digital signal, modulator means for modulating said serial format digital signal into a modulated signal and for coupling said modulated signal to respective ones of said pairs of ring and tip lines of said telephone transmission system as said first signal, said means for receiving comprising demodulator means coupled to said plurality of telephone transmission links for receiving and demodulating said modulated signals and second computer means coupled to said demodulator means for scanning each of said plurality of telephone transmission links for each of said first signals and for generating a digital data signal responsive to said first signals, said digital data signal coupled to third computer means, said third computer means generating an alarm signal responsive to predetermined conditions of said first signals.

16. The condition monitoring system according to claim 15 wherein the means for receiving when coupled to the information transmission system is substantially transparent to the information transmission system, 17. The condition monitoring system according to claim 15 including means coupled to the receiving means for at least one of indicating the status of the condition, storing the status of the condition and activating at least one of alarm apparatus and transmission apparatus.

18. The condition monitoring system according to claim 15 including a plurality of monitoring means disposed at each of said plurality of first locations for monitoring at least one common condition at the respective locations, each of the monitoring means providing a signal representative of the common condition, and means coupled to the receiving means for at least one of indicating the status of the common condition at one or more of the locations, storing the status of the common condition at the plurality of locations and activating at least one of alarm apparatus and transmission apparatus in response to one or more of the signals.

19. The condition monitoring system according to claim 15 including a plurality of monitoring means disposed at each of said plurality of first locations for monitoring at least one common condition at the respective locations, each of the monitoring means providing a signal representative of the common condition, and means coupled to the receiving means for processing the signals representing the common condition and determining a relationship of the common condition at the respective locations.

20. The condition monitoring system according to claim 19 wherein the monitoring means includes means for monitoring for the presence of a fire.

21. The condition monitoring system according to claim 20 wherein the means for monitoring for the presence of a fire includes at lesat one of means for monitoring for the presence of smoke, means for monitoring temperature and means for monitoring light.

22. The condition monitoring system according to claim 20 wherein the monitoring means includes means for monitoring temperature.

23. The condition monitoring system according to claim 20 wherein the monitoring means includes means for monitoring light.

24. The condition monitoring system according to claim 20 wherein the monitoring means includes intrusion detection means.

25. The condition monitoring system according to claim 15 wherein the means for transmitting is adapted to be coupled to a line of the telephone system to which a telephone is coupled.

26. The condition monitoring system according to claim 25 wherein the means for transmitting is substantially unaffected by the operating state of the telephone.

27. The condition monitoring system according to claim 25 wherein the means for transmitting and the means for receiving are substantially unaffected by the operating state of the telephone.

28. The condition monitoring system according to claim 15, further comprising second means for transmitting a signal from the second location to respective ones of said first locations for controlling said first computer means, and second means for receiving said second signal at the first location, said second transmitting means comprising modulator means and said second receiving means comprising demodulator means.

29. The condition monitoring system according to claim 15, further comprising switch means at said second location for coupling said plurality of telephone transmission links to said means for receiving.

30. The condition monitoring system according to claim 15, wherein said plurality of first locations comprises a plurality of groups of said first locations and further comprising second computer means at a plurality of second locations, each of said second computer means associated with respective ones of said groups.

* * * * *